J. L. WHEELER.
METALLIC THERMOMETER.
APPLICATION FILED DEC. 16, 1918.
1,325,547.
Patented Dec. 23, 1919.
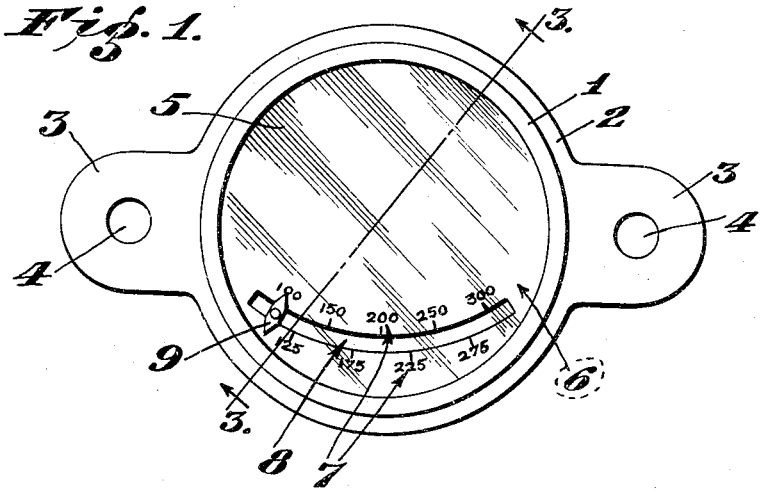
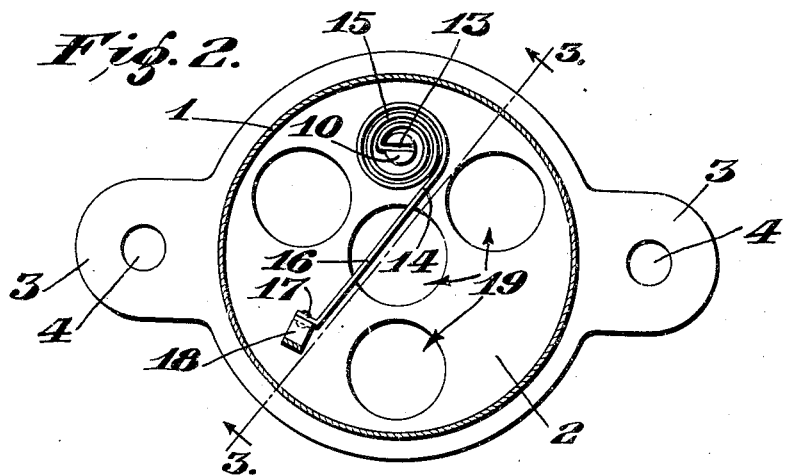
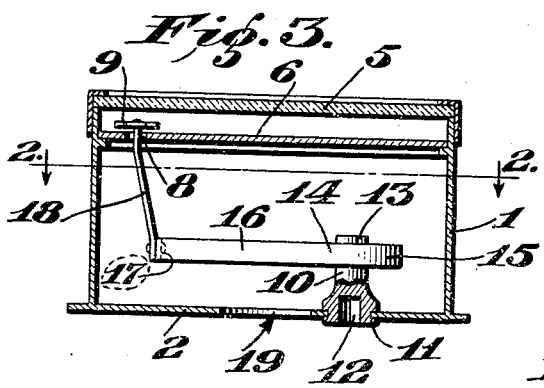
Inventor:
John L. Wheeler,
By George A. Pennington
his Atty.

UNITED STATES PATENT OFFICE.

JOHN L. WHEELER, OF ST. LOUIS, MISSOURI.

METALLIC THERMOMETER.

1,325,547.  Specification of Letters Patent.  Patented Dec. 23, 1919.

Application filed December 16, 1918. Serial No. 266,949.

*To all whom it may concern:*

Be it known that I, JOHN L. WHEELER, a citizen of the United States, residing in the city of St. Louis and State of Missouri, have invented a new and useful Improvement in Metallic Thermometers, of which the following is a specification.

This invention relates to temperature indicators of the kind known as metallic thermometers and employed more particularly for indicating the temperature of an oven or the like.

As heretofore constructed, these devices have comprised a system of levers, gears and other movable elements which are actuated through the distortion of a thermostatic motive element composed of a laminated bar or strip of two metals of different coefficients of expansion, such as steel and copper or brass.

Naturally, the construction and arrangement of the movable parts of the mechanism must be such as to avoid frictional resistance, and, accordingly, accurate bearings and fine adjustments are required to secure the necessary sensitiveness in operation. Therefore, owing to the usage to which oven thermometers are subjected and the difficulty in maintaining a lubricant in the bearings, due to the heat, the accuracy of indication is impaired in many instances. So, too, in structures embodying a multiplicity of coöperable moving parts, the movement of the indicating pointer is not always gradual, but occurs with irregularity and jumps and bounds.

The present invention has for its objects to secure regularity in the movement of the indicating pointer and accuracy of indication, to minimize the number of parts, and to attain certain advantages as will hereinafter more fully appear in the following specification.

The invention consists in a novel structure and in the parts and combinations and arrangements of parts hereinafter described and set forth in the appended claims.

In the accompanying drawing illustrating a practical adaptation of the invention,—

Figure 1 is a face view of the device;

Fig. 2 is a cross section taken just below the dial plate or on or about the line 2—2 of Fig. 3; and Fig. 3 is a section taken on or about the lines 3—3 of Figs. 1 and 2.

Referring now to the drawing, the numeral 1 designates the containing shell or housing which is generally cylindrical, and, in use, is inserted in an opening provided therefor in the door or wall of the oven, the base plate 2 of the device having ears 3 which are apertured, as at 4, for the reception of suitable bolts or screws (not shown) whereby it may be obviously secured in place on the wall or door, as the case may be.

In the outer end of the housing 1 is a glass plate 5 through which the dial plate 6 beneath is viewed. The dial plate 6 has a graduated scale 7 marked alternately on opposite sides of an arcuate slot 8 and accordingly numbered in succession, the arrangement being thus to avoid crowding the designating numerals and thereby make them clearly legible; and coöperating with said scale 7 is a movable indicating pointer 9 which is made substantially diamond shape or double ended (see Fig. 1).

Mounted on the base plate 2 is a stud 10 with whose axis the slot 8 of the dial plate 6 is concentric, said stud 10 being preferably riveted, as at 11, with sufficient tightness to remain normally immovable under ordinary conditions, but being capable of rotation in place when force is applied thereto through the medium of a suitable key or wrench, for which purpose a key socket 12 may be provided in the outer end of the stud as shown in Fig. 3.

The inner end portion of the stud 10 is slotted, as at 13, to receive the end portion of a thermostatic strip 14 of the ordinary bimetallic composition, such as a lamination of steel and copper or brass, or other suitable metals of different coefficients of expansion, a part of said strip being coiled spirally about the stud, as at 15, while the remainder thereof is extended, as at 16, substantially straightwise in proximity to the slot 8 of the dial plate 6. The free end portion of the strip 14 is turned angularly, as at 17, and has one end portion of a strip 18 of similar composition riveted or otherwise fastened thereto, the opposite end portion of said strip 18 being projected through said slot 8 and having the pointer 9 secured thereon. Obviously, though, the member 18 instead of being a separate piece may be an integral extension of the strip 14. That is to say, the end of the strip 14 may be extended and a portion thereof accordingly bent to afford an arm for the attachment of the pointer.

In coiling the strip 14 the side on which is the metal of greater coefficient of expansion is disposed inward with respect to the stud 10, so that as the temperature increases the coil unwinds and accordingly throws the straight portion with a swinging movement in the same direction, and a distortion of the straight portion occurs at the same time, thereby deflecting the extreme end portion whose path of travel is spirally or eccentric to the axis of the stud. To enable the pointer 9 to travel in a substantially true circle with respect to the axis of the stud and compensate for the eccentric movement of the part 16 of the strip 14 the member 18 has its side of greater coefficient of expansion disposed toward the stud whereby the deflection of its free end is away from the stud as the temperature increases, said member 18 being proportioned, of course, according to the relative expansive coefficiency of the layers of the strip 14.

To originally set the pointer, the adjustment is effected in a temperature corresponding to the lowest indicated graduation of the scale 7, by turning the stud 10 until the pointer registers with such graduation. This is readily accomplished owing to the peculiar mounting of the stud as hereinbefore pointed out.

In order that the thermostatic element may be actively subjected to the heat of the oven, the base plate 2 may be provided with the apertures 19, as shown, or any other openings, of suitable character and arrangement, can be provided either in said base plate or the cylindrical shell 1, as desired.

Should the temperature go above or below the range provided for within the limits of the scale 7, no damage will be done, as the extension 18 will bear against either end of the slot 8, and the strip 14, owing to its peculiar arrangement and resiliency, will yield and then return to its proper position as soon as the temperature comes again within the range of the scale.

Obviously, the device admits of considerable modification without in the least departing from the spirit of the invention. Therefore, it is not limited to the exact structure shown in the drawing.

What is claimed is:

1. In a thermometer, a metallic thermostatic motive element fastened at one end, but being free throughout the remainder thereof, and a counter thermostatic element of like character carried by the free end portion of said first mentioned element in compensating relation thereto, whereby a part of said counter thermostatic element moves in a definite predetermined direction different from said other element during the combined deflections of both elements.

2. In a thermometer, a metallic thermostatic motive element a portion of which moves in a non-circular path in operation, and a counter thermostatic element of like character carried by said first mentioned element in compensating relation thereto, whereby a part of the counter thermostatic element describes an arc of a substantially true circle during the combined deflections of both elements.

3. In a thermometer, a thermostatic metal strip supported at one end and coiled spirally in the region of its support, said strip having an extension of similar metals at its free end and disposed angularly and compensatively thereto, whereby the free end of said extension describes an arc of a substantially true circle in movement, and a pointer provided on the free end of said extension.

4. In a thermometer, a housing having an arcuate scale thereon, a metallic thermostatic strip supported at one end in said housing and coiled spirally in the region of its support, said strip being free throughout except at said support, and having an extension of similar metals at its free end and disposed angularly and compensatively thereto, the free end of said extension describing an arc of a substantially true circle in movement, and a pointer on said free end of said extension in coöperative relation to said scale.

5. In a thermometer, a housing, a dial plate therein having an arcuate slot with a scale marked along the edge thereof, a stud rotatively adjustable in said housing, a metallic thermostatic strip fastened at one end to said stud and coiled spirally thereabout and having a substantially straightwise extending portion, an angular extension on said strip having its free end projected through said arcuate slot and having a pointer thereon in coöperative relation to said scale, said angular extension comprising metals similar to said strip and arranged compensatively thereto whereby to cause said pointer to describe an arc of a substantially true circle in movement.

In testimony whereof, I have hereunto set my hand, this 23rd day of November, 1918, at St. Louis, Missouri.

JOHN L. WHEELER.